(12) United States Patent
Nakagawa

(10) Patent No.: US 7,302,173 B2
(45) Date of Patent: Nov. 27, 2007

(54) OPTICAL APPARATUS

(75) Inventor: Kazuyuki Nakagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 401 days.

(21) Appl. No.: 11/168,741

(22) Filed: Jun. 28, 2005

(65) Prior Publication Data

US 2005/0286881 A1 Dec. 29, 2005

(30) Foreign Application Priority Data

Jun. 29, 2004 (JP) .............................. 2004-191318

(51) Int. Cl.
- G03B 7/28 (2006.01)
- G03B 7/99 (2006.01)
- G03B 13/00 (2006.01)
- G03B 17/04 (2006.01)
- G03B 19/12 (2006.01)

(52) U.S. Cl. .................. 396/111; 348/333.09; 348/345; 359/618

(58) Field of Classification Search .................. 396/77, 396/111, 121, 125, 139, 148; 348/333.09, 348/345; 359/618
See application file for complete search history.

(56) References Cited

U.S. PATENT DOCUMENTS

| | | | |
|---|---|---|---|
| 4,624,542 A | 11/1986 | Ikeno et al. | 354/152 |
| 6,183,142 B1 | 2/2001 | Sakamoto et al. | 396/358 |
| 2005/0219401 A1* | 10/2005 | Oikawa | 348/345 |
| 2005/0219402 A1* | 10/2005 | Noto | 348/345 |

FOREIGN PATENT DOCUMENTS

EP 1 447 709 A2 8/2004

OTHER PUBLICATIONS

European Patent Office Action issued on Aug. 11, 2006 for European application No. 05 254 034.1-1234.

* cited by examiner

*Primary Examiner*—Melissa Jan Koval
(74) *Attorney, Agent, or Firm*—Cowan, Liebowitz & Latman, P.C.

(57) ABSTRACT

A camera, in which it is possible to adjust the position of two mirrors easily for striking a balance between the focus detection performances in an optical viewfinder state and an electronic image display state. The optical apparatus includes a first mirror movable between a first position for an optical viewfinder and a second position for focus detection, a second mirror movable between a third position for focus detection and a fourth position where a light flux is not led to the second mirror, a first positioning member for positioning the first mirror at the second position, and a second positioning member for positioning the second mirror at the third position. The second positioning member is a member independent of the first positioning member.

7 Claims, 15 Drawing Sheets

OPTICAL APPARATUS

BACKGROUND OF THE INVENTION

1. Filed of the Invention

The present invention relates to optical apparatuses having a mirror dividing an optical path.

2. Description of the Related Art

Conventionally, a camera has been disclosed in Japanese Patent Laid-Open Publication No. 2001-125173, which is switchable between an optical viewfinder state and an electronic image display state by moving a half mirror between a first position where the mirror leads light from a taking lens to the optical viewfinder and a second position where the mirror leads the light to an image-pickup device. In this camera, focus detection by the phase difference detection method can be performed in the optical viewfinder state. However, only focus detection by the contrast detection method can be performed in the electronic image display state because the image-pickup device takes images in a state in which the mirror has retreated from the optical path.

In addition, a camera has been disclosed in U.S. patent Laid-Open Publication No. 2004-0155976, in which an optical path dividing system is switchable between a first optical path dividing state and a second optical path dividing state; a light flux from a taking lens is divided into a light flux directing to an optical viewfinder and another light flux directing to a focus detection device in the first optical path dividing state, and the light flux from the taking lens is divided into a light flux directing to an image-pickup device and another light flux directing to the focus detection device in the second optical path dividing state.

According to this camera, the focus detection by the phase difference detection method can be performed not only in the optical viewfinder state (the first optical path dividing state) but also in the electronic image display state (the second optical path dividing state).

In this camera, the focus detection by the phase difference detection method can be achieved in both the optical viewfinder state and the electronic image. However, the common positioning member is used for positioning a sub mirror that reflects the light flux to the focus detection device in the first optical path dividing state and positioning a half mirror that reflects the light flux to the focus detection device in the second optical path dividing state. Therefore, it is difficult to adjust the positioning member for striking a balance between the focus detection performances in the two states.

SUMMARY OF THE INVENTION

One object of the present invention is to provide an optical apparatus in which it is possible to adjust the position of the two mirrors easily for striking a balance between the focus detection performances in the optical viewfinder state and the electronic image display state.

An optical apparatus as an aspect of the present invention comprises: a viewfinder optical system; a focus detection device; a first mirror movable between a first position where the first mirror leads an incident light flux to the viewfinder optical system and a second position where the first mirror leads the incident light flux to the focus detection device; a second mirror movable between a third position where the second mirror leads an incident light flux to the focus detection device and a fourth position where the light flux does not make incident to the second mirror; a first positioning member, which positions the first mirror at the second position; and a second positioning member, which positions the second mirror at the third position. The second positioning member is a member independent of the first positioning member.

An optical apparatus as another aspect of the present invention comprises: a viewfinder optical system; a focus detection device; a first mirror movable between a first position where the first mirror leads an incident light flux to the viewfinder optical system and a second position where the first mirror leads the incident light flux to the focus detection device; a first driving member, which drives the first mirror; a second mirror movable between a third position where the second mirror leads an incident light flux to the focus detection device and a fourth position where the light flux is not led to the second mirror; a second driving member, which drives the second mirror; a first positioning member, which contacts the first driving member to position the first mirror at the second position; and a second positioning member, which contacts the second driving member to position the second mirror at the third position. The second positioning member is a member independent of the first positioning member.

Other objects and features of the present invention will become apparent from the following description and the attached drawings.

DESCRIPTION OF THE PREFERRED EMBODIMENTS

A description will now be given of the preferred embodiment of the present invention by referring to the accompanying drawings.

Embodiment 1

Figure 1:
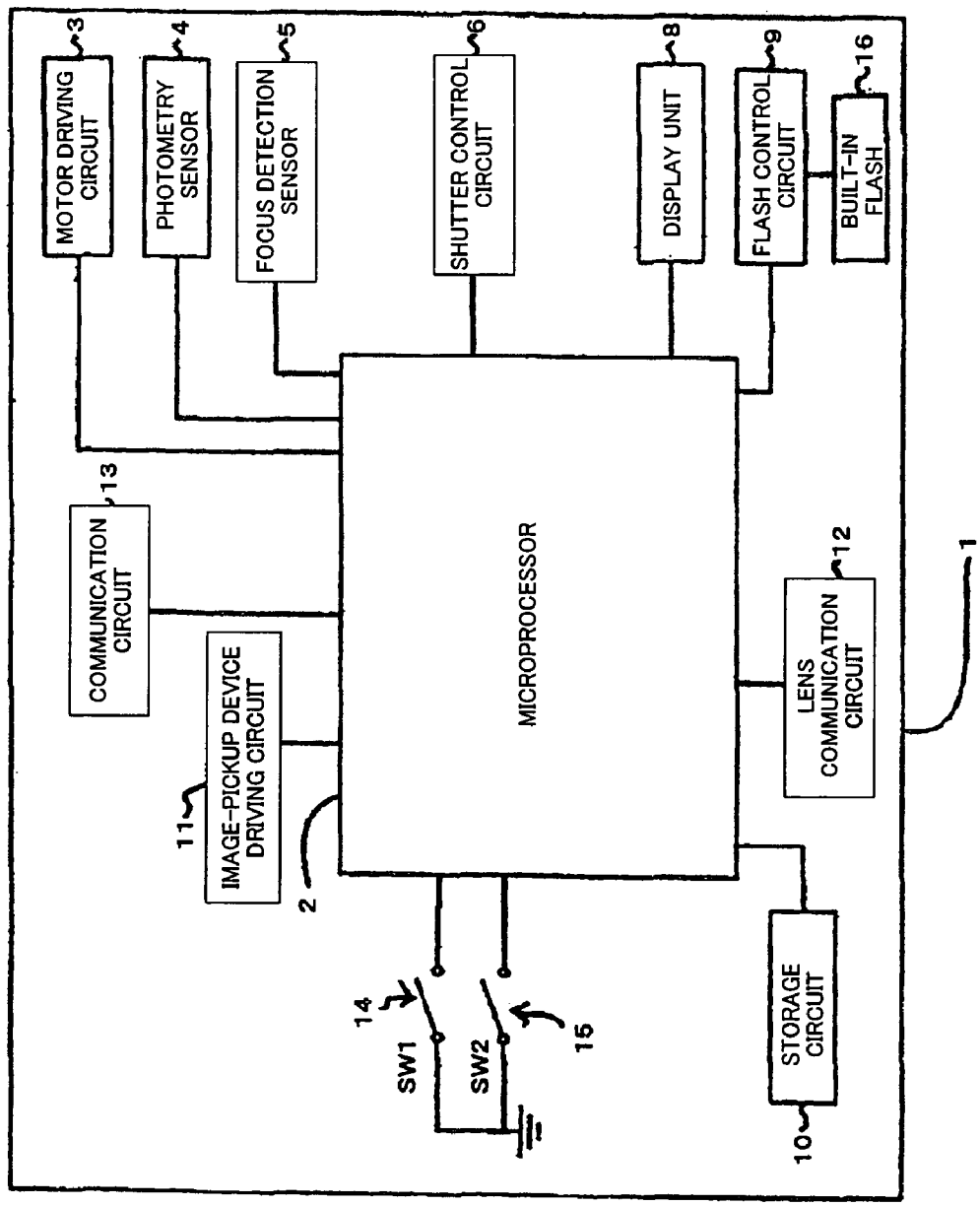
FIG. 1 is a block diagram showing the electrical structure of the camera system of Embodiment 1 of the present invention.

FIG. 1 is a block diagram showing the main electric structure of the camera constituting the camera system of Embodiment 1 of the present invention.

In FIG. 1, reference numeral 2 denotes a microprocessor controlling the operation of a camera body 1. Reference numeral 3 denotes a motor driving circuit. The motor driving circuit 3 receives a control signal from the microprocessor 2 to drive a motor, not shown in the figure provided in the camera body 1. The motor is a drive source of movable members such as the after-mentioned half mirror and sub mirror, which are provided in the camera body 1.

Reference numeral 4 denotes a photometry sensor for measuring luminance of an object. The photometry sensor 4 outputs the photometry result to the microprocessor 2. The microprocessor 2 calculates an exposure value (aperture value and shutter speed) by the photometry result from the photometry sensor 4. Reference numeral 5 denotes a focus detection sensor for detecting a focus state of an image-taking optical system. The focus detection sensor 5 performs focus detection by the phase difference detection method.

Reference numeral 6 denotes a shutter control circuit. The shutter control circuit 6 receives a control signal from the microprocessor 2 to control a shutter unit provided in the camera body 1, thereby making it possible to adjust the amount of light reaching an image-pickup device from the image-taking optical system.

Reference numeral 8 denotes a display unit. The display unit 8 displays image data generated from the output of the image-pickup device and predetermined information. Reference numeral 9 denotes a flash control circuit. The flash control circuit 9 receives a control signal from the microprocessor 2 to control a flash 16 built-in the camera body 1.

Reference numeral 10 denotes a storage circuit storing information on the setting state of the camera body 1 or the like. Reference numeral 11 denotes an image-pickup-device driving circuit for drive the image-pickup device. Reference numeral 12 denotes a lens communication circuit communicating with a lens apparatus mounted on the camera body 1. The microprocessor 2 can communicate with a lens control circuit, not shown in the figure, provided in the lens apparatus via the lens communication circuit 12.

Concretely, the lens control circuit receives information on the drive amount of a focus lens, which is obtained from the detection result of the focus detection sensor 5, from the microprocessor to move the focus lens provided in the lens apparatus in a direction of the optical axis, thereby performing focusing.

In addition, the lens control circuit receives information on the aperture value from the microprocessor to control the drive of an aperture diaphragm via the diaphragm control circuit, thereby making it possible to adjust the amount of light taken in the camera body 1 from the lens apparatus.

Reference numeral 13 denotes a communication circuit communicating with an accessory other than the lens apparatus such as an illumination apparatus or a recording medium, which is mounted on the camera body 1.

Reference numeral 14 denotes a SW1-switch for starting the image-taking preparation operation such as a photometry operation and focusing operation. Reference numeral 15 denotes a SW2-switch for starting the image-taking operation, which exposes the image-pickup device and records an image read out from the image-pickup device to the recording medium.

Reference numeral 16 denotes the built-in flash. The built-in flash 16 illuminates an object when the external illumination apparatus is not mounted on the camera body 1 and irradiates AF (automatic focusing) fill light to the object when the AF is performed.

Figure 2:
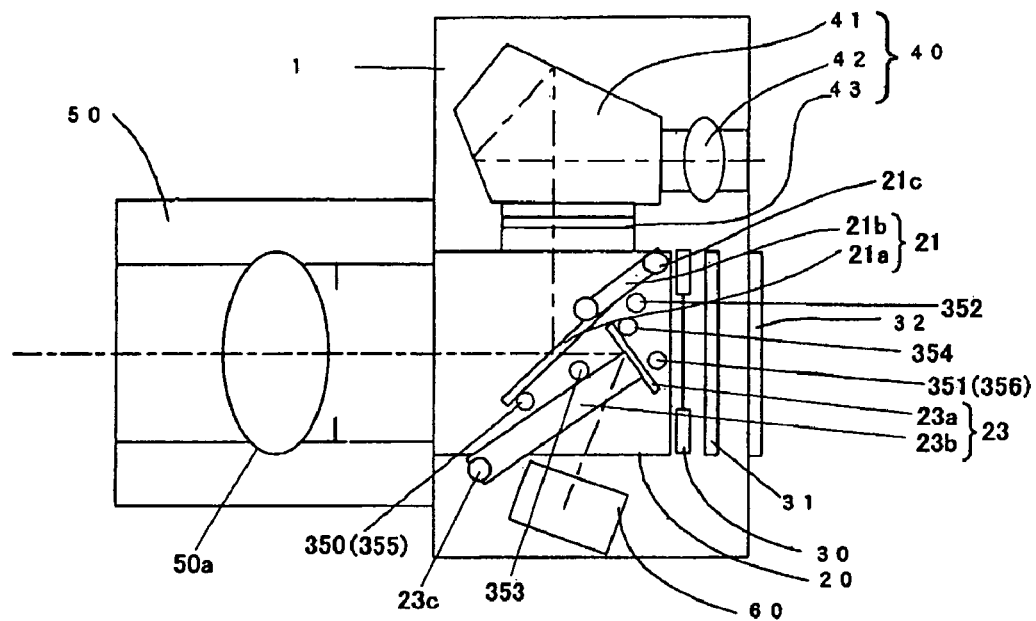
FIG. 2 is a construction drawing of the camera system of Embodiment 1 when the mirror mechanism is set to the OVF mode.
Figure 3:
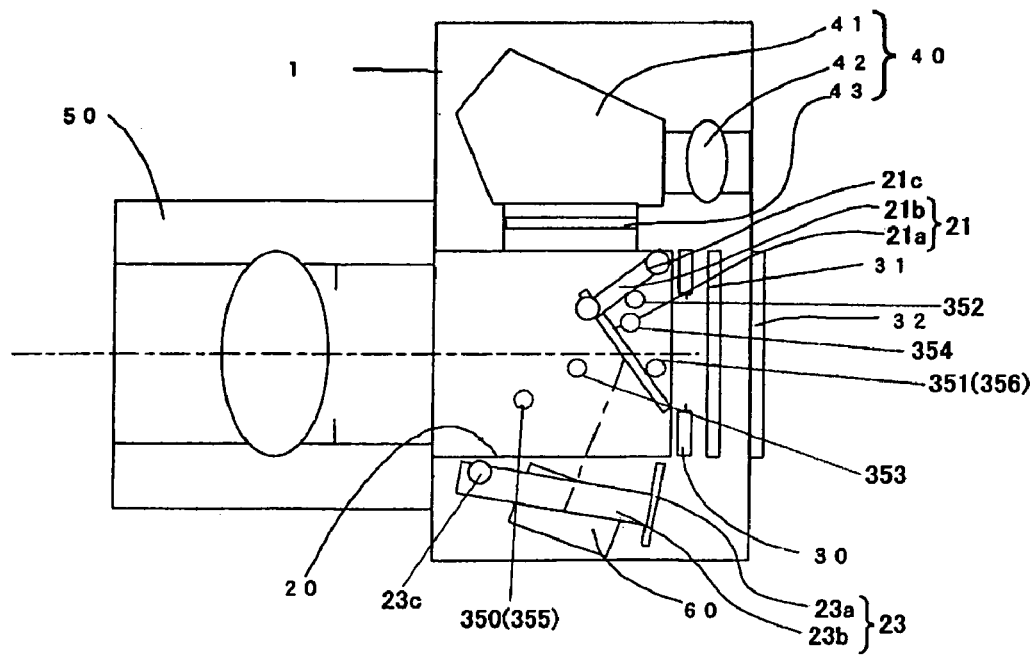
FIG. 3 is a construction drawing of the camera system of Embodiment 1 when the mirror mechanism is set to the EVF mode.
Figure 4:
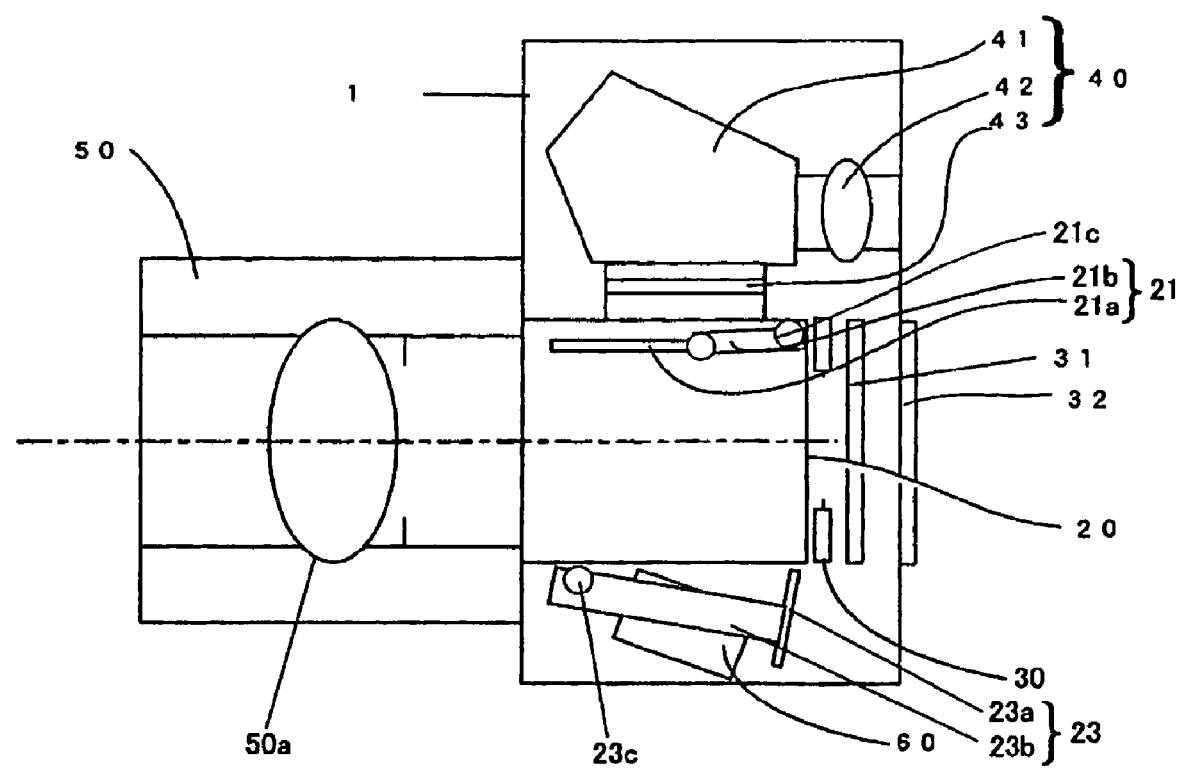
FIG. 4 is a construction drawing of the camera system of Embodiment 1 when the mirror mechanism is set to the image-taking mode.

FIGS. 2 to 4 are sectional views showing the outline configuration of the camera system of the present embodiment. FIG. 2 shows a state in which an OVF mode (optical viewfinder mode), which is a mode for viewing an object image through an optical viewfinder, is set. FIG. 3 shows a state in which an EVF mode (electronic viewfinder mode), which is a mode for viewing an object image through the display unit 8, is set. FIG. 3 shows the camera system in an image-taking state.

In FIGS. 2 to 4, reference numeral 20 denotes a mirror box, 21 a half mirror unit (first mirror unit). The half mirror unit 21 is constituted by the half mirror 21a and a half mirror lever 21b.

The half mirror lever 21b, which holds the half mirror 21a, is attached rotatably around a rotation shaft 21c provided on the mirror box 20.

Reference numeral 23 denotes a sub mirror unit (second mirror unit). The sub mirror unit 23 is constituted by the sub mirror 23a and a sub mirror lever 23b. The sub mirror lever 23b, which holds the sub mirror 23a, is attached rotatably around a rotation shaft 23c provided on the mirror box 20.

The rotation of the sub mirror lever 23b around the rotation shaft 23c provided on the mirror box 20 moves the sub mirror 23a into and out of the image-taking optical path.

Reference numeral 31 denotes the image-pickup device such as a CCD sensor or a CMOS sensor. The image-pickup device 31 converts an optical image formed by the image-taking optical system into electric charges by its photoelectrical converting function and accumulates the charge. The charge is read out as electronic signals. Reference numeral 30 denotes the shutter unit (focal plane shutter), which adjusts the amount of light entering the image-pickup device 31.

Reference numeral 32 denotes a display device included in the display unit 8, which is provided on the exterior surface of the camera body 1. A photographer can observe images and predetermined information displayed on the display device 32 from the outside of the camera body 1.

Reference numeral 40 denotes a finder optical system constituting the optical viewfinder. The finder optical system (optical viewfinder) 40 includes a penta prism 41, a finder lens 42 and a focusing plate 43. In the state shown in FIG. 2, the object light reflected by the half mirror unit 21 forms an object image on the focusing plate 43.

Further, the object image formed on the focusing plate 43 is converted into an erected image in the penta prism 41. The photographer can observe the object image formed on the focusing plate 43 through the finder lens 42.

Reference numeral 60 denotes a focus detection unit including the focus detection sensor 5, which detects the focus state of the image-taking optical system by the phase difference detection method. In the OVF mode shown in FIG. 2, the object light from the lens apparatus 50 is transmitted through the half mirror unit 21, reflected by the sub mirror unit 23, and then enters the focus detection unit 60. In the EVF mode shown in FIG. 3, the object light from the lens apparatus 50 is reflected by the half mirror unit 21, and then enters the focus detection unit 60. The focus detection unit 60 detects the focus state based on the entered light.

Reference numeral 50 denotes the lens apparatus mounted on the camera body 1, the lens apparatus having an image-taking lens 50a constituting the image-taking optical system.

Reference numeral 353 denotes a sub-mirror-lever positioning member (second positioning member), which is fixed to the mirror box 20. The sub-mirror-lever positioning member 353 positions the sub mirror unit 23 at a third position in the image-taking optical path by contact with the sub mirror lever 23*b* in the OVF mode, as shown in FIG. 2.

Reference numeral 354 denotes a sub-mirror positioning member (second positioning member), which is fixed to the mirror box 20. The sub-mirror positioning member 354 positions the sub mirror unit 23 at the third position in the image-taking optical path by contact with the sub mirror 23*a* in the OVF mode. The sub mirror unit 23 located at the third position reflects the light coming from the image-taking lens 50*a* toward the focus detection unit 60.

Reference numeral 350 denotes a half-mirror positioning member (third positioning member), which is fixed to the mirror box 20. The half-mirror positioning member 350 positions the half mirror unit 21 at a first position in the image-taking optical path by contact with the half mirror 21*a* in the OVF mode, as shown in FIG. 2.

Reference numeral 355 denotes also a half-mirror positioning member (third positioning member), which is fixed to the mirror box 20. The half-mirror positioning member 355 is arranged at substantially the same position of the half-mirror positioning member 350 when viewed from the direction vertical to the paper of FIG. 2.

The half mirror unit 21 located at the first position reflects part of the light entering from the image-taking lens 50*a* toward the finder optical system 40, and transmits the remaining part thereof. The transmitted light enters the sub mirror unit 23 located at the third position as described above.

Reference numeral 352 denotes a half-mirror-lever positioning member (first positioning member), which is fixed to the mirror box 20. The half-mirror-lever positioning member 352 positions the half mirror unit 21 at a second position in the image-taking optical path by contact with the half mirror lever 21*b* in the EVF mode, as shown in FIG. 3.

Reference numeral 351 denotes a half-mirror positioning member (first positioning member), which is fixed to the mirror box 20. The half-mirror positioning member 351 positions the half mirror unit 21 at the second position in the image-taking optical path by contact with the half mirror 21*a* in the EVF mode, as shown in FIG. 3.

The half mirror unit 21 located at the second position reflects part of the light entering from the image-taking lens 50*a* toward the focus detection unit 60, and transmits the remaining part thereof. The transmitted light forms an image on the image-pickup plane of the image-pickup device 31, the image being photoelectrically converted and then output as electronic signals.

In the EVF mode, the sub mirror unit 23 is located at a fourth position outside the image-taking optical path, as shown in FIG. 4.

When SW2 is operated, the half mirror unit 21 and the sub mirror unit 23 are moved out of the image-taking optical path as shown in FIG. 4, and then the image-taking operation of the camera is started.

Figure 5:
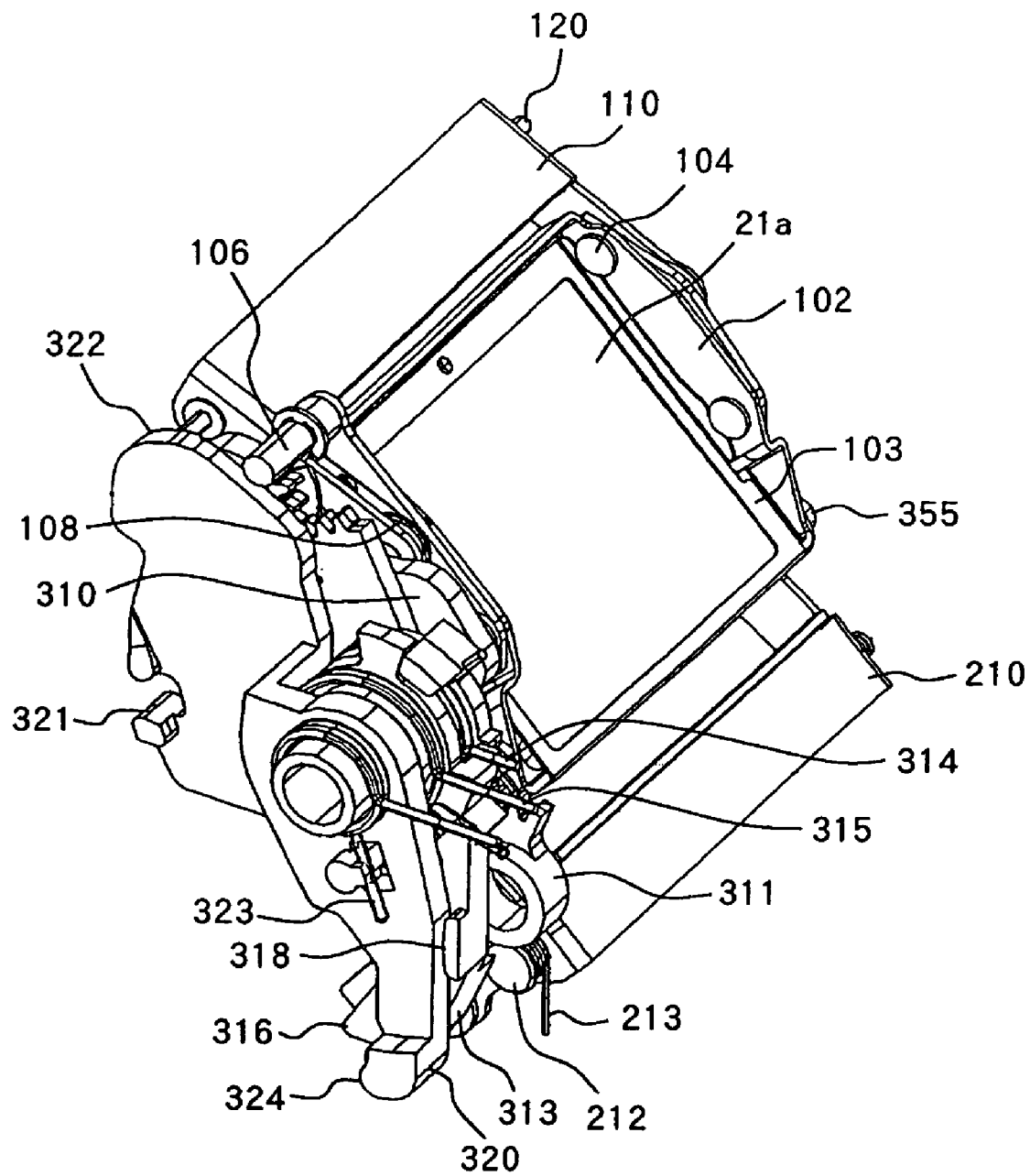
FIG. 5 is a perspective view of the mirror mechanism in the OVF mode.
Figure 6:
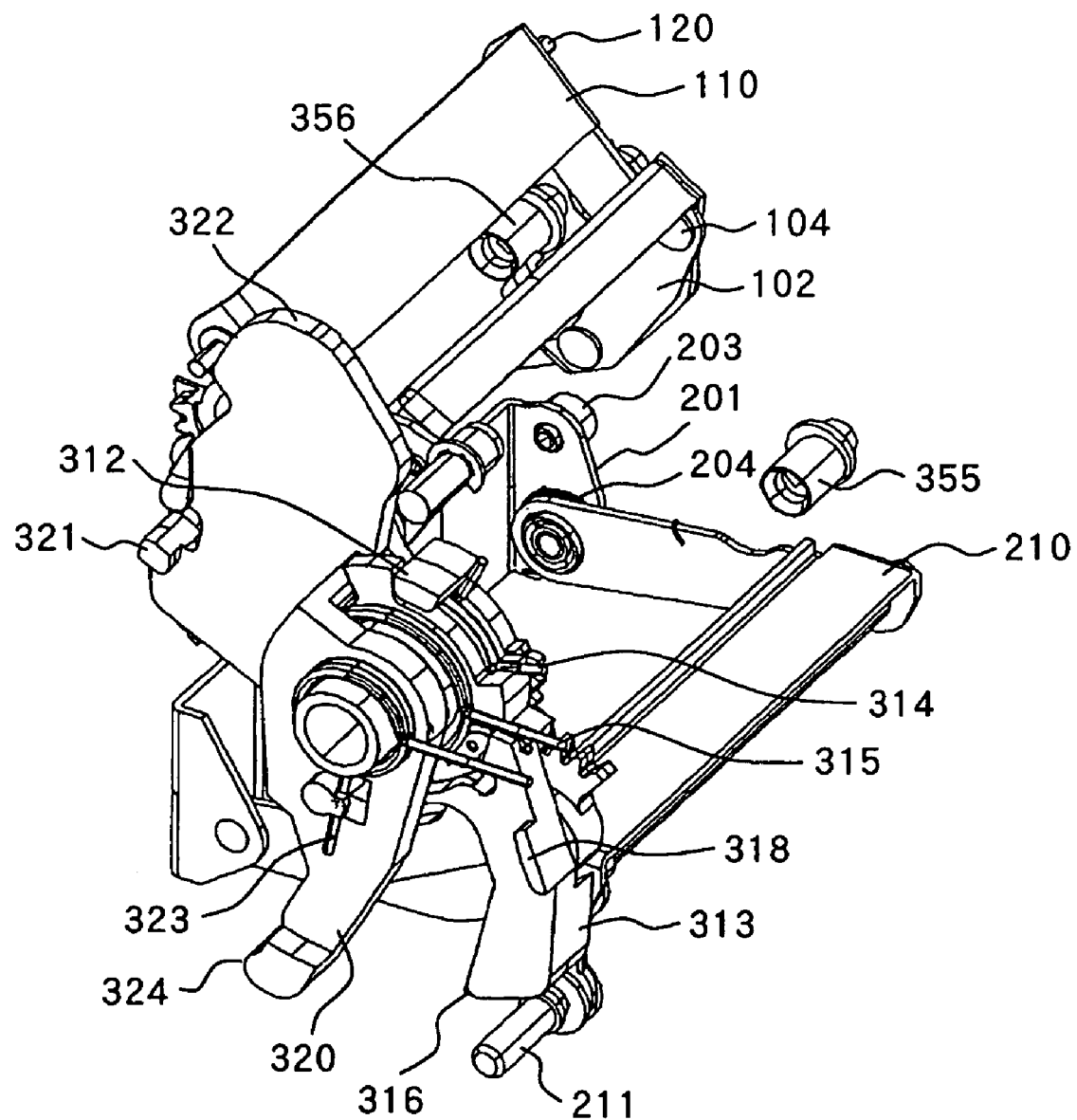
FIG. 6 is perspective view of the mirror mechanism in the EVF mode.
Figure 7:
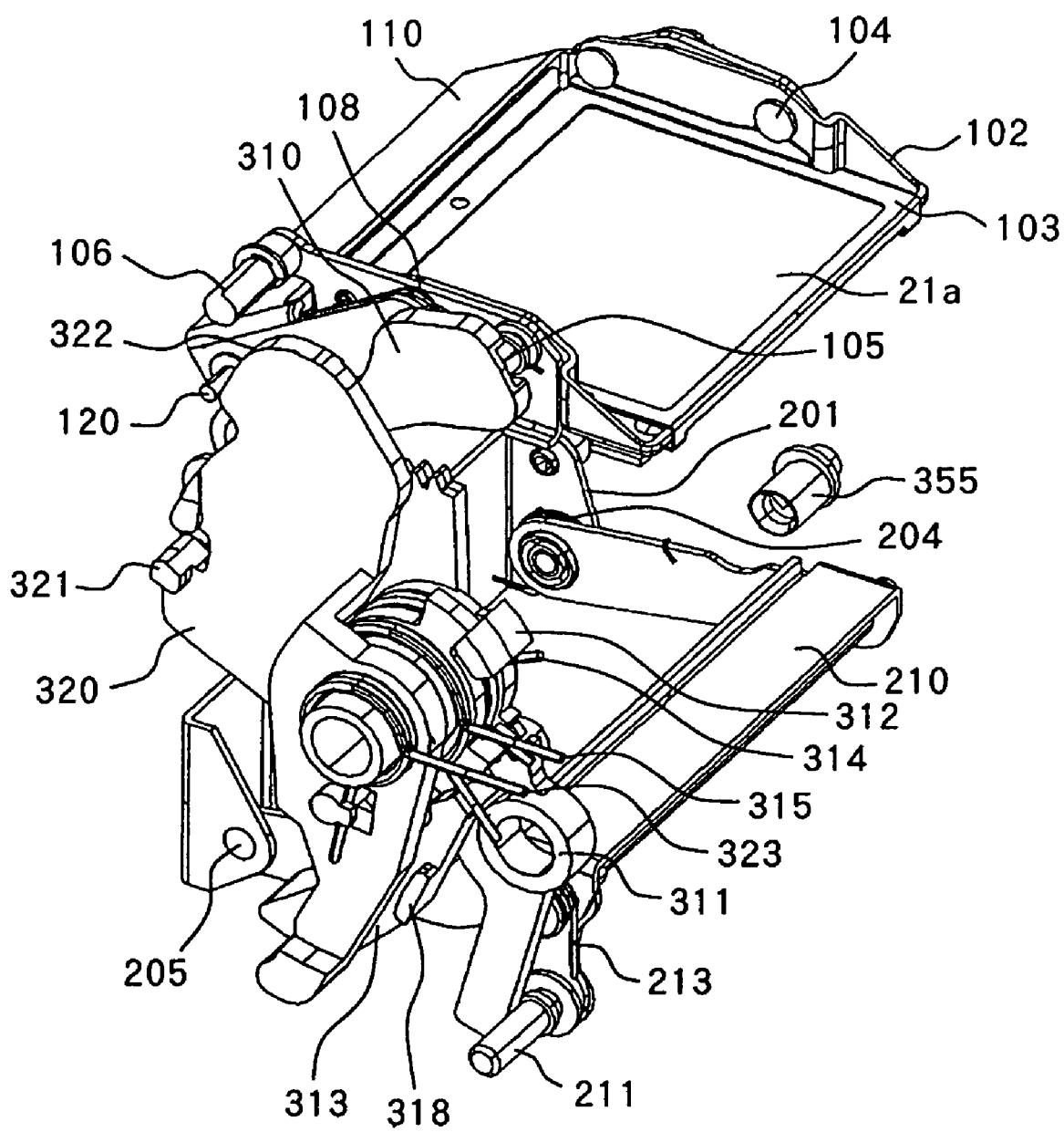
FIG. 7 is a first perspective view of the mirror mechanism in the image-taking mode.
Figure 8:
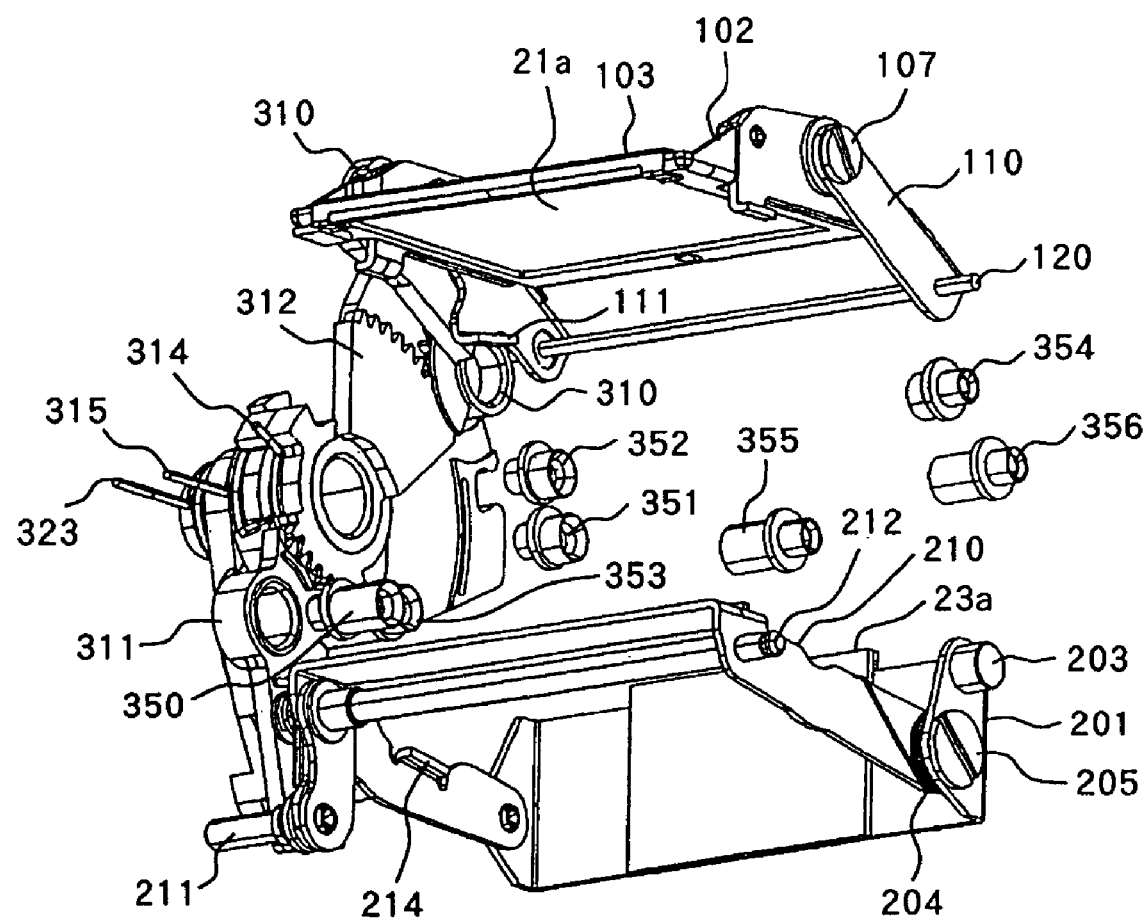
FIG. 8 is a second perspective view of the mirror mechanism in the image-taking mode.

FIGS. 5 to 8 are external perspective views of the mirror unit including the half mirror unit 21 and the sub mirror unit 23. FIG. 5 is an external perspective view of the mirror unit in an object observation state in the OVF mode. FIG. 6 is an external perspective view of the mirror unit in an object observation state in the EVF mode. FIGS. 7 and 8 are external perspective views of the mirror unit in the image-taking state.

The half mirror unit 21 includes the following members. Reference numeral 21*a* denotes the half mirror, which reflects part of the light transmitted through the image-taking lens 50*a* and transmits the remaining part thereof.

Reference numeral 102 denotes a half-mirror holding plate, which holds the half mirror 21*a*. Reference numeral 104 denotes a half-mirror retaining pin, a plurality of the half-mirror retaining pins 104 being provided on the half-mirror holding plate 102.

Reference numeral 103 denotes a half-mirror retaining spring, which presses the half mirror 21*a* to the half-mirror holding plate 102. The half-mirror retaining spring 103 is constituted so as to generate a pressing force by the half mirror retaining pins 104.

Reference numeral 105 denotes a half-mirror driving shaft. The half-mirror driving shaft 105 is fixed to the half-mirror holding plate 102. Reference numeral 106 denotes a half-mirror camshaft. The half-mirror camshaft 106 is fixed to the half-mirror holding plate 102. Reference numeral 107 denotes a half-mirror inversion shaft. A pair of the half-mirror inversion shafts 107 is provided on the half-mirror holding plate 102.

Reference numeral 110 denotes a half-mirror-holder lever. The half-mirror-holder lever 110 supports the half-mirror holding plate 102 rotatably around the half-mirror inversion shafts 107. Reference numeral 110 denotes a half-mirror-holder positioning member. The half-mirror-holder positioning member 111 stabilizes the position of the half-mirror-holder lever 110 by contact with the half-mirror-lever positioning member 352 in the EVF mode. In other words, as shown in FIG. 3, the half-mirror-holder positioning member 111 positions the half mirror unit 21 in the image-taking optical path in the EVF mode.

Reference numeral 120 denotes a half-mirror hinge shaft, which is attached to the mirror box 20. The half-mirror hinge shaft 120 rotatably supports the half mirror 21*a*.

Reference numeral 108 denotes a half-mirror swinging spring. The half-mirror swinging spring 108 gives a spring force to the half-mirror holding plate 102 and the half-mirror-holder lever 110 around the half-mirror inversion shaft 107 so as to hold them in a predetermined state.

The sub mirror unit 23 includes the following members. Reference numeral 201 denotes a sub-mirror holder. Reference numeral 23*a* denotes the sub mirror. The sub mirror 23*a* is fixed to the sub-mirror holder 201. Reference numeral 203 denotes a sub-mirror camshaft. The operation of the sub mirror unit 23 is controlled by a cam member, not shown in the figure, which is provided on the mirror box, via the sub-mirror camshaft 203.

Reference numeral 204 denotes a sub-mirror swinging spring. The sub-mirror swinging spring 204 gives a spring force between the after-mentioned sub-mirror holder lever 210 and the sub-mirror holder 201. The sub-mirror swinging spring 204 gives the spring force to the sub mirror unit 23 so that the sub mirror unit 23 may contact the sub-mirror positioning member 354 in the OVF mode. Reference numeral 205 denotes a sub-mirror-holder hinge shaft. The sub-mirror-holder hinge shaft 205 supports the sub-mirror holder 201 rotatably with respect to the after-mentioned sub-mirror holder lever 210.

Reference numeral 210 denotes the sub-mirror holder lever. The sub-mirror holder lever 210 supports the sub-mirror holder 201 rotatably with respect to the mirror box 20. Reference numeral 211 denotes a sub-mirror driving shaft. The sub-mirror driving shaft 211 is fixed to the sub-mirror holder lever 210. Reference numeral 212 denotes a sub-mirror hinge shaft. The sub-mirror hinge shaft 212 supports the sub mirror unit 23 rotatably with respect to the mirror box 20.

Reference numeral 213 denotes a sub-mirror driving spring. The sub-mirror driving spring 213 is arranged on the same axis with the sub-mirror hinge shaft 212. One end of the sub-mirror driving spring 213 is fixed to the mirror box 20, and the other end is fixed to the sub-mirror driving shaft 211. Thereby, the sub-mirror driving spring 213 generates a spring force in a direction where the sub mirror unit 23 is moved into the image-taking optical path.

The sub mirror unit 23 is positioned in the OVF mode by contact of the sub-mirror holder lever 210 biased by the sub-mirror driving spring 213 with the sub-mirror-lever positioning member 353.

The driving unit for the half mirror unit 21 and sub mirror unit 23 is constituted by the following members.

Reference numeral 310 denotes a half-mirror driving lever. The half-mirror driving lever 310 engages with the half-mirror driving shaft 105 to drive the half mirror unit 21. Reference numeral 311 denotes a sub-mirror driving lever. The sub-mirror driving lever 311 engages with the sub-mirror driving shaft 211 to drive the sub mirror unit 23.

Reference numeral 312 denotes a mirror driving gear. The mirror driving gear 312 interlocks the half-mirror driving lever 310 with the sub-mirror driving lever 311.

Reference numeral 313 denotes a mirror driving lever. The mirror driving lever 313 is arranged on the same axis with the mirror driving gear 312. Reference numeral 314 denotes an absorbing spring. The absorbing spring 314 is arranged between the mirror driving gear 312 and the mirror driving lever 313 so as to be located on the same axis with them. One end of the absorbing spring 314 is fixed to the mirror driving gear 312, and the other end is fixed to the mirror driving lever 313.

The absorbing spring 314 absorbs a deformation of the mirror driving lever 313 by an over-charging force and generates a force for moving the mirror down at the time of the mirror down.

Reference numeral 315 denotes a mirror driving spring. One end of the mirror driving spring 315 is fixed to the mirror box 20, and the other end is fixed to the mirror driving lever 313. The force generated by the mirror driving spring 315 drives the half mirror unit 21 upward.

Reference numeral 316 denotes an input portion of the mirror driving lever 313. Inputting a driving force to the input portion 316 charges the mirror driving spring 315, thereby making it possible to drive the half mirror unit 21 downward.

Next, the description will be give of the shutter driving mechanism. Reference numeral 320 denotes a shutter driving lever. The shutter driving lever 320 is supported on the same axis with the mirror driving lever 313. Reference numeral 321 denotes a shutter driving portion provided on the shutter driving lever 320. The shutter driving portion 321 engages with the shutter unit 30 to charge it and release the charge.

Reference numeral 322 denotes a half-mirror-unit driving cam provided on the shutter driving lever 320. Driving the mirror driving lever 313 while keeping the shutter driving lever 320 at a predetermined position makes the half-mirror-unit driving cam 322 contact the half-mirror camshaft 106, thereby driving the half mirror unit 21.

Reference numeral 323 denotes a shutter driving spring. One end of the shutter driving spring 323 is fixed to the mirror box 20, and the other end is fixed to the shutter driving lever 320. Reference numeral 324 denotes an input portion of the shutter driving lever 320. Inputting a driving force to the input portion 324 charges the shutter driving spring 323, thereby charging the shutter unit 30.

In each of FIGS. 5 to 8, the mirror positioning member provided on the mirror box 20 is shown. As described above, reference numeral 350 denotes the half-mirror positioning member, which positions the half mirror unit 21 in the OVF mode. Reference numeral 351 denotes the half-mirror positioning member, which positions the half mirror unit 21 in the EVF mode. Reference numeral 352 denotes the half-mirror-lever positioning member, which positions the half mirror lever 21b in the EVF mode. Reference numeral 353 denotes the sub-mirror-lever positioning member, which positions the sub-mirror holder lever 210 in the OVF mode. Reference numeral 354 denotes the sub-mirror positioning member, which positions the sub mirror unit 23 in the OVF mode.

Reference numeral 355 denotes the half-mirror positioning member, which assists the positioning of the half mirror unit 21 in the OVF mode. The half-mirror positioning member 355 is arranged at approximately the same position in the mirror box 20. Reference numeral 356 denotes a half-mirror positioning member, which assists the positioning of the half mirror unit 21 in the EVF mode. The half-mirror positioning member 356 is arranged at approximately the same position in the half-mirror positioning member 351 in the mirror box 20. In other words, the half-mirror positioning members 350 and 355 position the half mirror unit 21 in the OVF mode, and the half-mirror positioning members 351 and 356 position the half mirror unit 21 in the EVF mode.

As shown in FIG. 8, of the half-mirror positioning members 350, 351, 352, 355 and 356, the half-mirror positioning members 350, 351 and 352, which are arranged on a side closer to the half-mirror driving lever 310 giving the driving force to the half mirror unit 21, are the primary positioning members. On the other hand, the half-mirror positioning members 355 and 356, which are not arranged on the side closer to the half-mirror driving lever 310, are assistant positioning members.

As described above, using the half-mirror positioning members 350, 351 and 352 arranged on the side closer to the half-mirror driving lever 310 as the primary positioning members makes it possible to stabilize the position of the half mirror unit 21 after a position adjustment. The same can be said on the sub-mirror-lever positioning member 353 arranged on the side closer to the sub-mirror driving lever 311.

Furthermore, the half-mirror positioning member 356 and sub-mirror positioning member 354 can function as a positioning member, respectively, by their different distances from the image-taking optical axis (the distance between the image-taking optical axis and the half-mirror positioning member 356 is shorter than the distance between the image-taking optical axis and the sub-mirror positioning member 354 as shown in FIGS. 2 and 3). Thereby, it is possible to increase the arrangement freedom of the positioning members.

Each of the above-mentioned positioning members is constituted by a pin provided on the mirror box 20. The pin is rotatably attached to the mirror box 20, its rotation axis being eccentric. Therefore, rotating each positioning member around the rotation axis makes it possible to perform fine adjustment of each position of the half mirror unit 21 and sub mirror unit 23 in the OVF and EVF modes.

Next, the description will be given of the mirror units with reference to FIGS. 5 to 7.

In FIG. 5 that shows the OVF mode, the half mirror unit 21 is arranged obliquely in the image-taking optical path so as to divide the light flux from the image-taking optical system. The light flux from the image-taking optical system is divided by the half mirror unit 21 into a light flux directing to the finder optical system 40 and another light flux directing to the sub mirror unit 23. The sub mirror unit 23 is arranged obliquely in the image-taking optical path so that the sub mirror 23a may reflect the light flux that has been transmitted through the half mirror 21a to lead it to the focus detection unit 60.

The mirror driving lever 313 and the shutter driving lever 320 are driven so as to charge the mirror driving spring 315 and the shutter driving spring 323, respectively. The half mirror unit 21 is held so as to be pressed to the half-mirror positioning member 350 by the absorbing spring 314. The sub mirror unit 23 is held so as to be pressed to the sub-mirror positioning member 354 and sub-mirror-lever positioning member 353 by the sub-mirror swinging spring 204 and sub-mirror driving spring 213.

Figure 9:
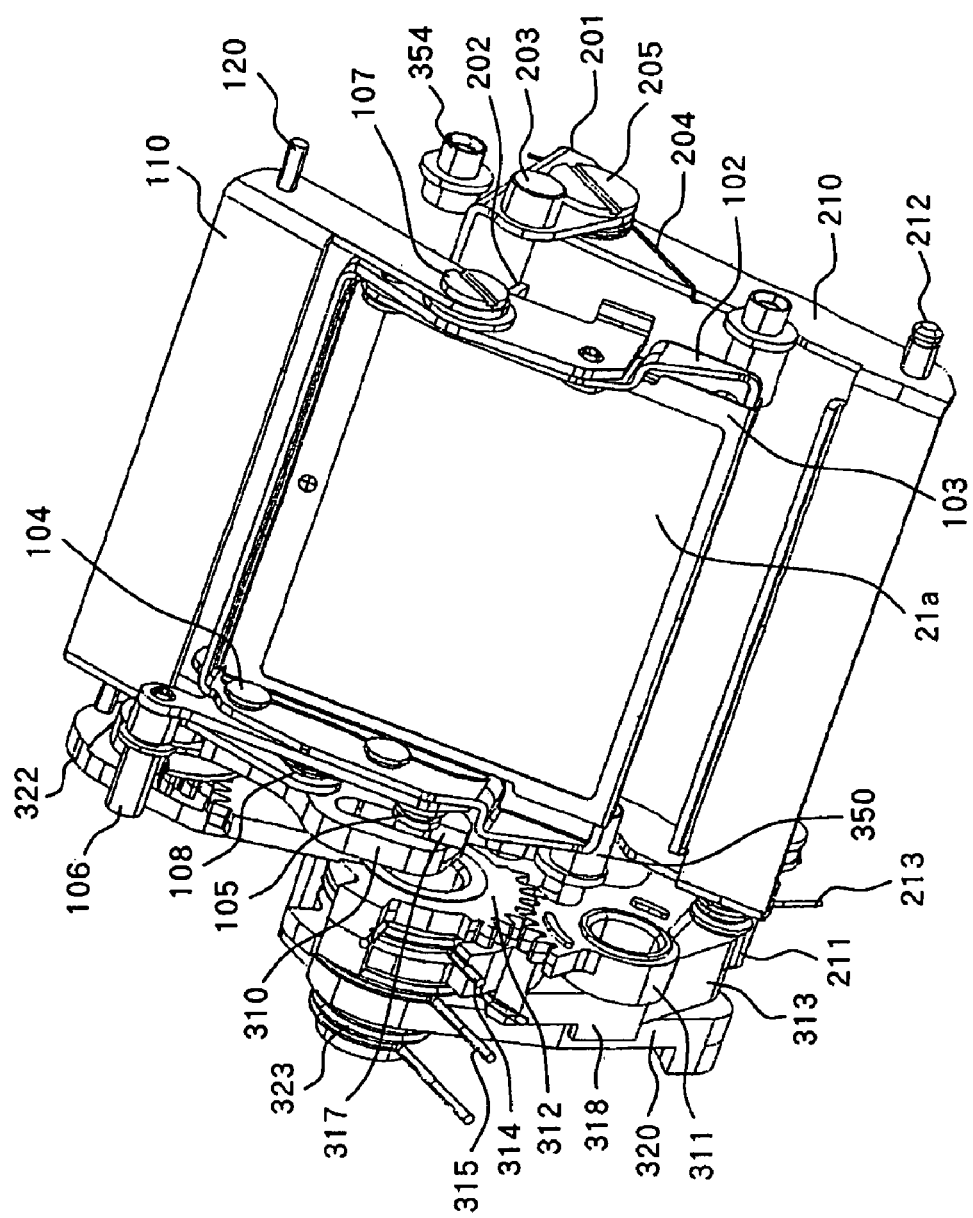
FIG. 9 is a perspective view of the mirror mechanism in the OVF mode.

In FIG. 6 that shows the EVF mode, the sub mirror unit 23 is arranged at the retreat position outside the image-taking optical path, the reflective surface of the half mirror 21a in the half mirror unit 21 being arranged at approximately the same position as the sub mirror 23a shown in FIG. 9.

Here, the reflective surface of the half mirror 21a is arranged at not completely the same position but approximately the same position because the incident light on the sub mirror 23a in the OVF mode refracts when it is transmitted through the half mirror 21a and its optical path is slightly different from that of the incident light on the half mirror 21a in the EVF mode.

If the positioning member for the sub mirror 23a in the OVF mode and the positioning member for the half mirror 21a in the EVF mode are common (identical) member, it is not possible to make the positions of these mirrors 23a and 21a differ from each other. In contrast, according to the present embodiment, the half mirror unit 21 and the sub mirror unit 23 are positioned by the separate members, respectively, thereby making it possible to set the position of the sub mirror 23a in the OVF mode and the position of the half mirror 21a in the EVF mode individually. Therefore, it is possible to increase the detection accuracy of the focus detection unit 60.

The positioning of the half mirror unit 21 is performed by pressing the half-mirror-holder lever 110 to the half-mirror-lever positioning member 352 and pressing the half-mirror holding plate 102 to the half-mirror positioning member 351, by the biasing force of the absorbing spring 314.

The shutter driving lever 320 is held in a state in which the charge of the shutter unit (not shown in the figure) is released. The mirror driving lever 313 is held in a state in which it is driven by an amount more than its charge amount shown in FIG. 5.

In FIG. 7 that shows the image-taking state, the half mirror unit 21 and the sub mirror unit 23 are retreated outside the image-taking optical path, the light from the image-taking lens 50a forming an image on the image-pickup plane of the image-pickup device 31. The electronic signal corresponding to the image is output from the image-pickup device 31.

An external driving force does not act on the mirror driving lever 313 and the shutter driving lever 320. Both the half mirror unit 21 and sub mirror unit 23 are set at the standby position by the spring forces of the mirror driving spring 315 and shutter driving spring 323.

Figure 10:
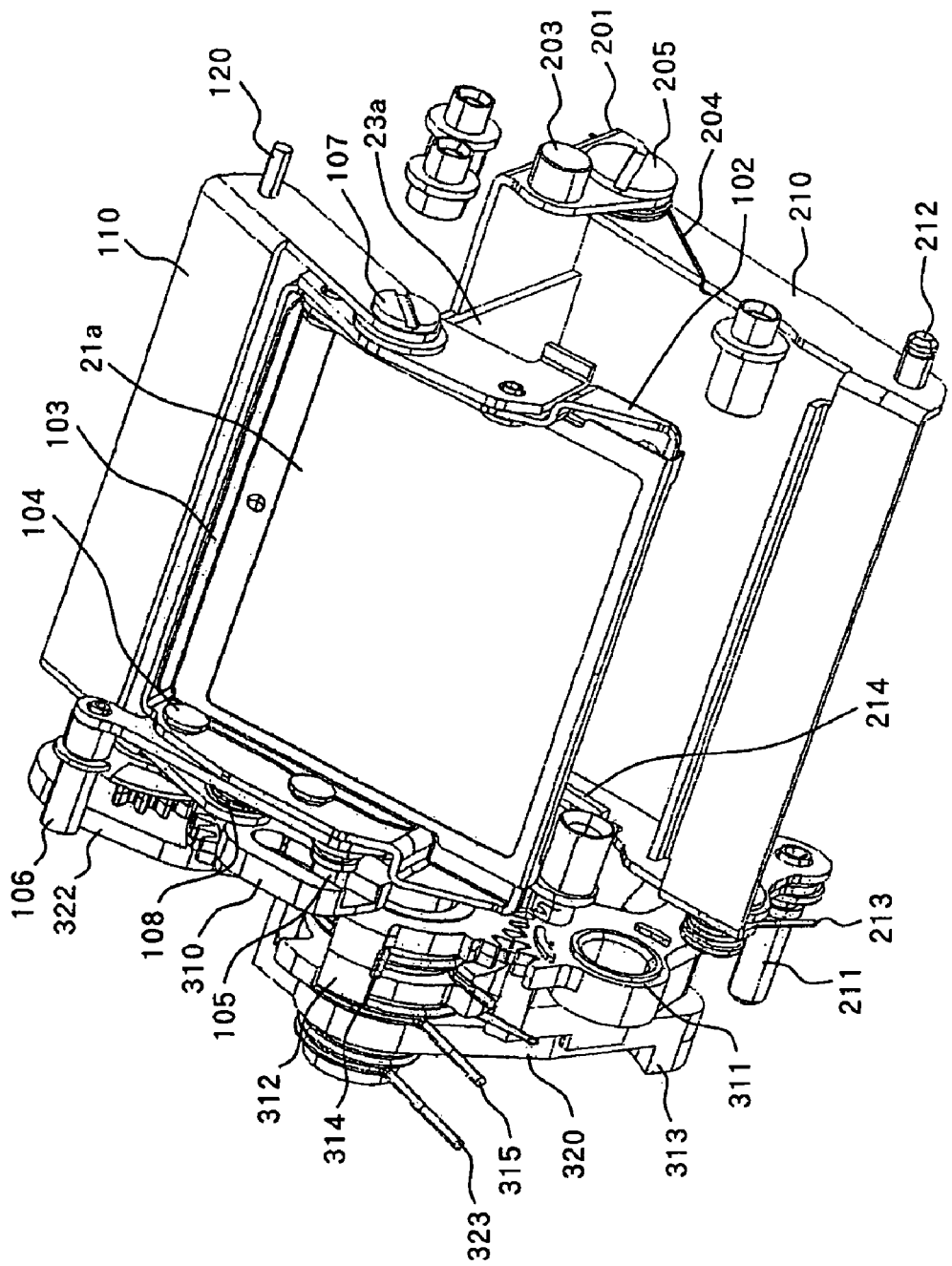
FIG. 10 is a perspective view of the mirror mechanism in the middle of switching between the OVF mode and the image-taking mode.
Figure 11:
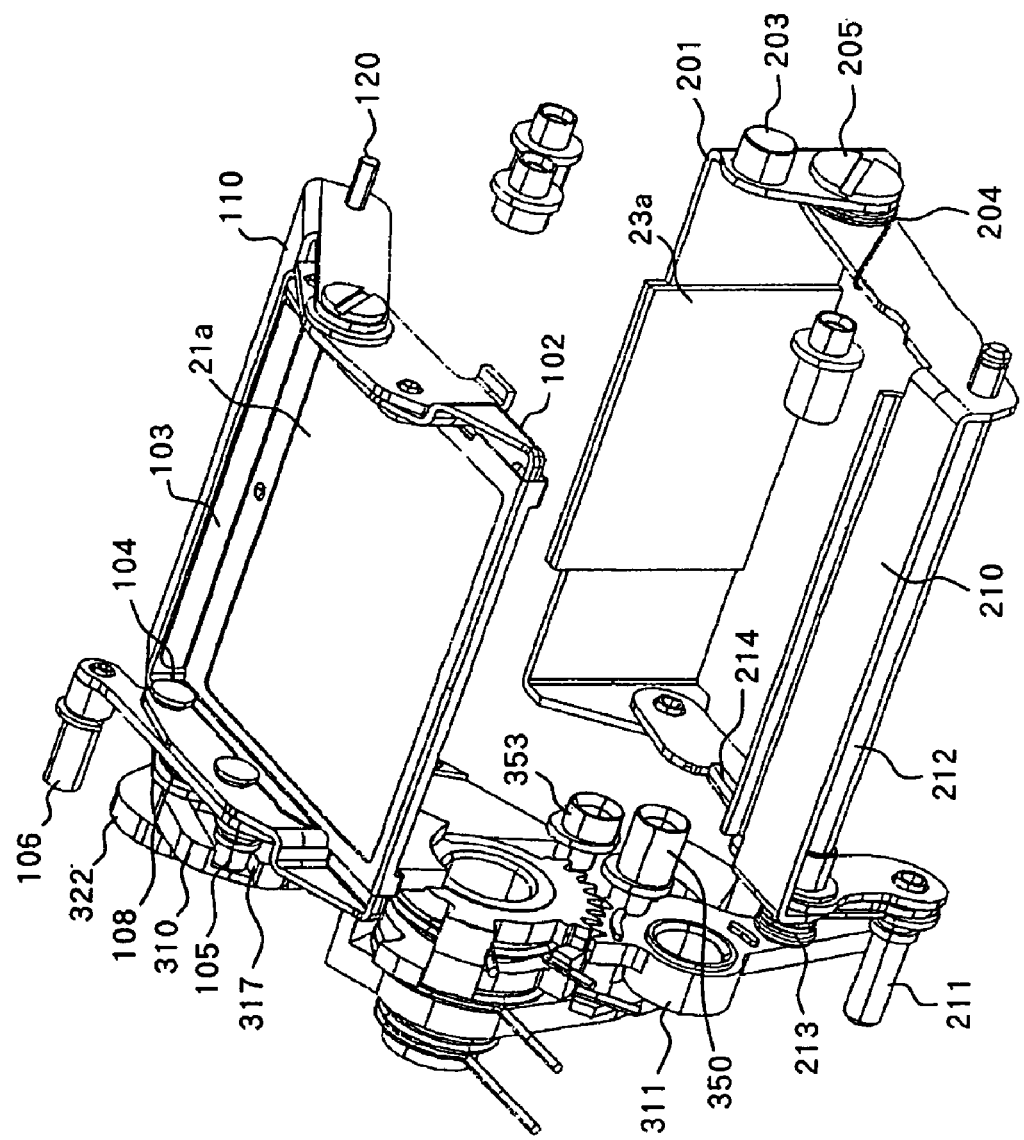
FIG. 11 is a perspective view of the mirror mechanism in the image-taking mode.

Next, the description will be given of the operation of the mirror driving mechanism with reference to FIGS. 9 to 16. FIGS. 9 to 11 are perspective views showing the operation of the mirror driving mechanism when operating between the object observation state and the image-taking state in the OVF mode.

FIG. 9 is a perspective view of the mirror driving mechanism in the object observation state in the OVF mode, the figure being a perspective view of the mirror driving mechanism when viewed from a direction different from FIG. 5. FIG. 10 is a perspective view of the mirror driving mechanism in the middle of the operation from the object observation state to the image-taking state in the OVF mode. FIG. 11 is a perspective view of the mirror driving mechanism in the image-taking mode, the figure being a perspective view of the mirror driving mechanism when viewed from a direction different from FIG. 7.

Now, the description will be given of the mirror driving operation from the object observation state to the image-taking state in the OVF mode.

First, in the object observation state shown in FIG. 9, as described using FIG. 5, the mirror driving lever 313 and the shutter driving lever 320 are held in a state in which they have been charged by an external driving force.

At this time, the half mirror unit 21 is pressed to the half-mirror positioning member 350 by the engagement of the half-mirror driving shaft 105 with a half-mirror driving portion 317. The pressing force in this case is generated by the absorbing spring 314.

The contact of the half-mirror camshaft 106 with the half-mirror holder lever 110 makes it possible to stabilize the angle formed between the half-mirror holding plate 102 and the half-mirror holder lever 110. Further, holding the half mirror unit 21 at three points of half-mirror hinge shaft 120 and the half-mirror positioning members 350 and 355 makes it possible to keep the angle of the half mirror unit 21 in the object observation state.

As for the sub mirror unit 23, an external driving force is not given directly to the sub-mirror driving shaft 211, and the biasing force of the sub-mirror driving lever 311 is not given thereto, either. By the contact of the sub-mirror holder lever 210 with the sub-mirror-lever positioning member 353 by the biasing forces of the sub-mirror driving spring 213 and sub-mirror swinging spring 204, and the contact of the sub-mirror holder 201 with the sub-mirror positioning member 354, the sub mirror unit 23 is positioned in the image-taking optical path.

From this state, when the mirror-up operation is started, the driving force that has been given to the mirror driving lever 313 and shutter driving lever 320 is released. Thereby, the mirror driving lever 313 and the shutter driving lever 320 are driven by the biasing forces of the mirror driving spring 315 and shutter driving spring 323.

When the drive of the mirror driving lever 313 and shutter driving lever 320 is started, the retreating operation of the half mirror unit 21 and sub mirror unit 23 from the image-taking optical path is started, as shown in FIG. 10. The half mirror unit 21 is driven by the half-mirror driving lever 310, and the sub-mirror unit 23 is driven by the sub-mirror driving lever 311.

Then, the half mirror unit 21 and sub mirror unit 23 are completely retreated from the image-taking optical path, thereby becoming the image-taking state, as shown in FIG. 11. The operation from the image-taking state to the object observation state is performed in reverse order from the above-described operation in FIGS. 9 to 11.

In the image-taking state shown in FIG. 11, a driving force is given to the shutter driving lever 320 when the operation is started. When the drive of the shutter driving lever 320 is started, it contacts a shutter-driving-lever interlocking portion 318 provided on the mirror driving lever 313. Thereby, the shutter driving lever 320 and the mirror driving lever 313 are simultaneously driven.

Since the shutter driving lever 320 and the mirror driving lever 313 are simultaneously driven as described above, the half-mirror-unit driving cam 322 retreats simultaneously with the drive of the half mirror unit 21, and do not drive the half-mirror camshaft 106. Accordingly, the half-mirror holding plate 102 and the half-mirror holder lever 110 move into the image-taking optical path in a state in which they are held by the half-mirror swinging spring 108, and reach the positions in the object observation state shown in FIG. 9 through the state shown in FIG. 10. Thereby, it becomes possible to observe the object through the optical viewfinder 40.

FIGS. 11 to 16 are perspective views showing the operation of the mirror driving mechanism when operating between the object observation state and the image-taking state in the EVF mode. The description will hereinafter be given of the mirror driving operation between the object observation state and the image-taking state in the EVF mode with reference to FIGS. 11 to 16.

Figure 15:
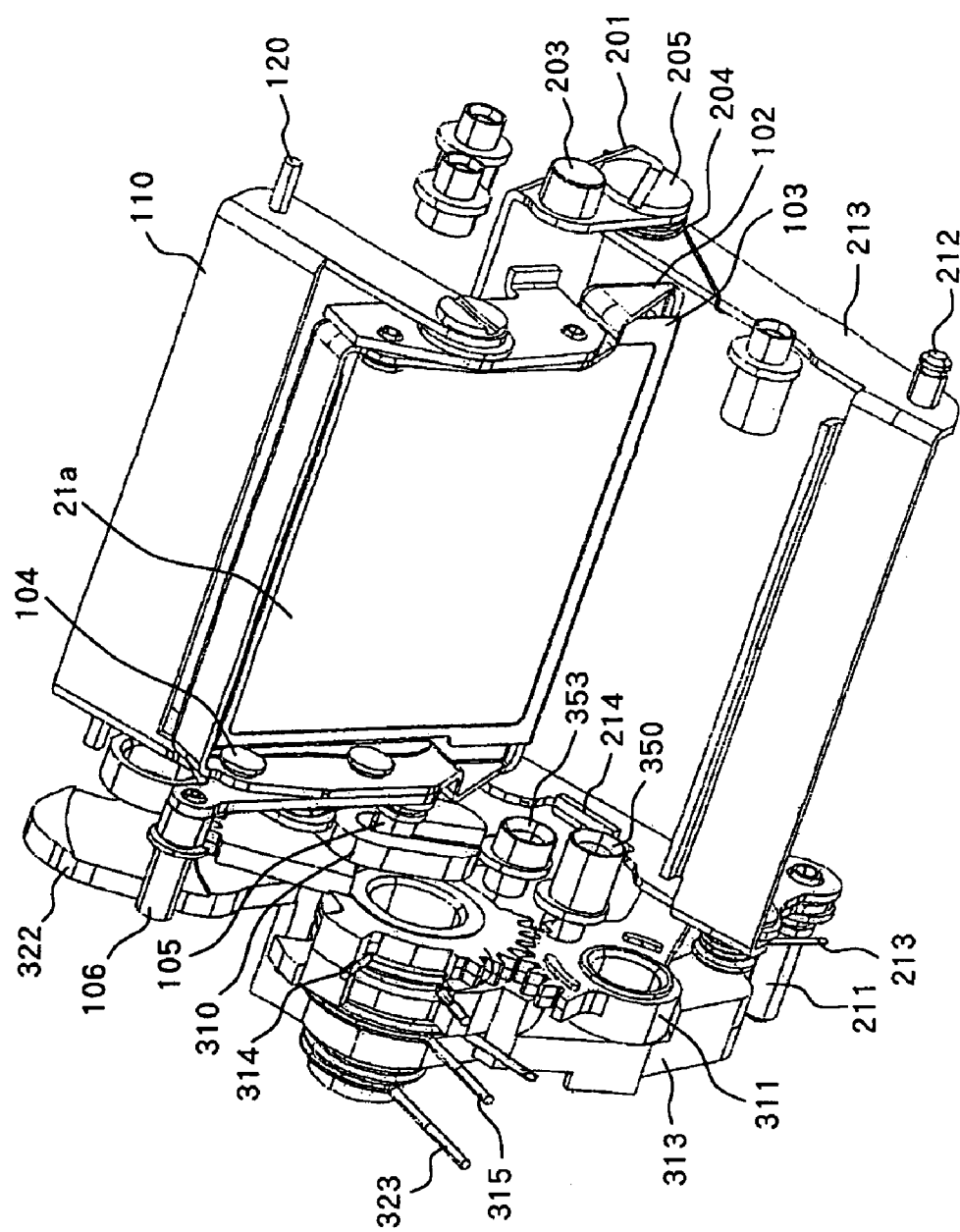
Figure 16:
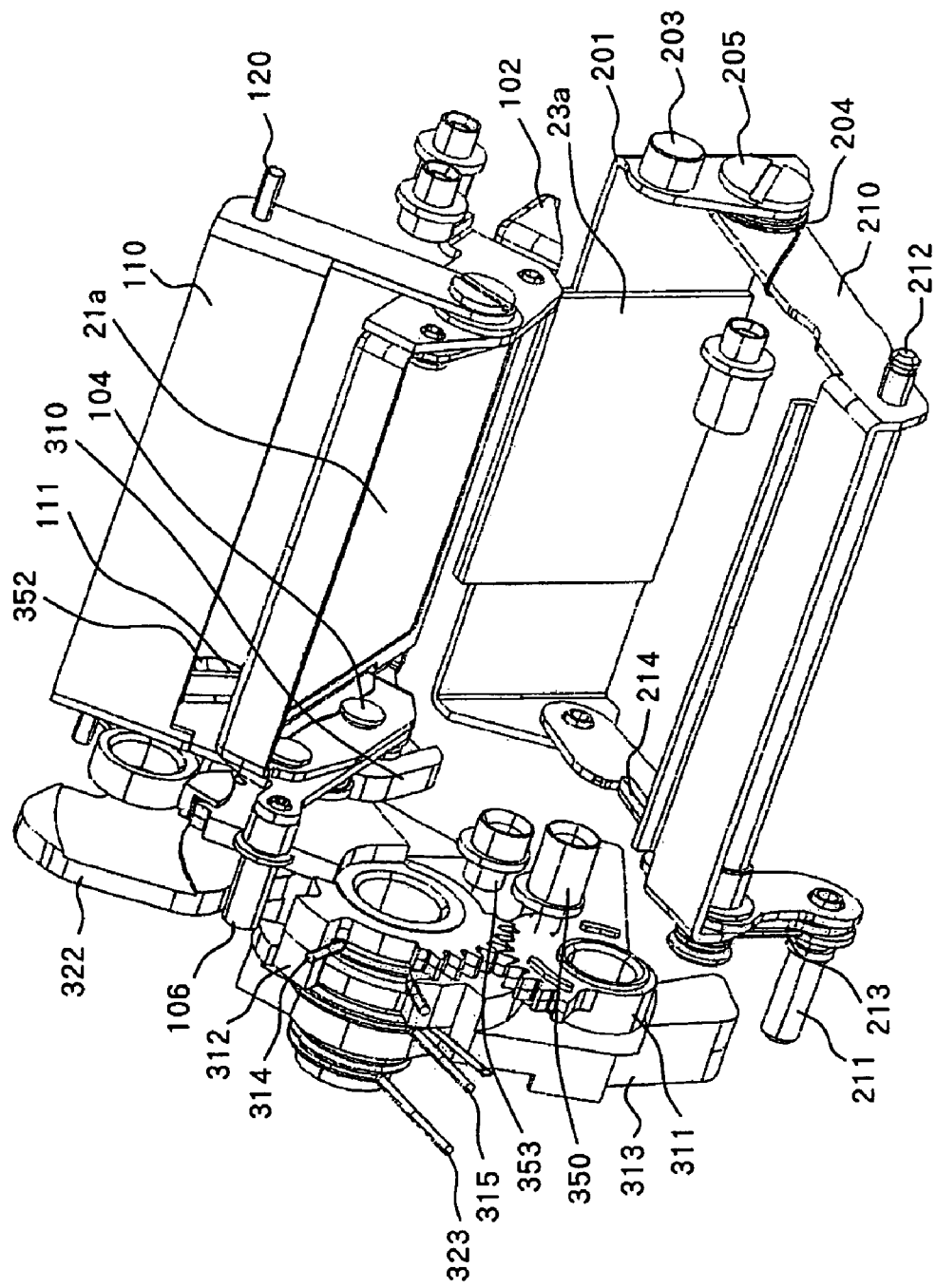
FIG. 16 is a perspective view of the mirror mechanism in the EVF mode.

FIG. 16 is a perspective view of the mirror driving mechanism in the EVF mode, the figure being a perspective view of the mirror driving mechanism when viewed from a direction different from FIG. 6. FIGS. 12 to 15 are perspective views of the mirror driving mechanism in the middle of switching between the object observation state and the image-taking state in the EVF mode.

Now, the description will be given of the mirror driving operation from the image-taking state to the object observation state. The drive from the image-taking state to the object observation state is performed by the input of an external driving force to the input portion 316 of the mirror driving lever 313.

When the external driving force is input to the input portion 316 of the mirror driving lever 313, the mirror driving lever 313 is driven, and charges the mirror driving spring 315. At the same time, the mirror driving gear 312 provided on the same axis with the mirror driving lever 313 is driven integrally with the mirror driving lever 313. Since the mirror driving lever 313 and the mirror driving gear 312 are interlocked with each other by the absorbing spring 314, the driving force is transmitted to the mirror driving gear 312 until the mirror driving gear 312 is stopped.

The mirror driving gear 312 is connected to the half-mirror driving lever 310 and sub-mirror driving lever 311, each lever driving the half mirror unit 21 and the sub mirror unit 23.

Figure 12:
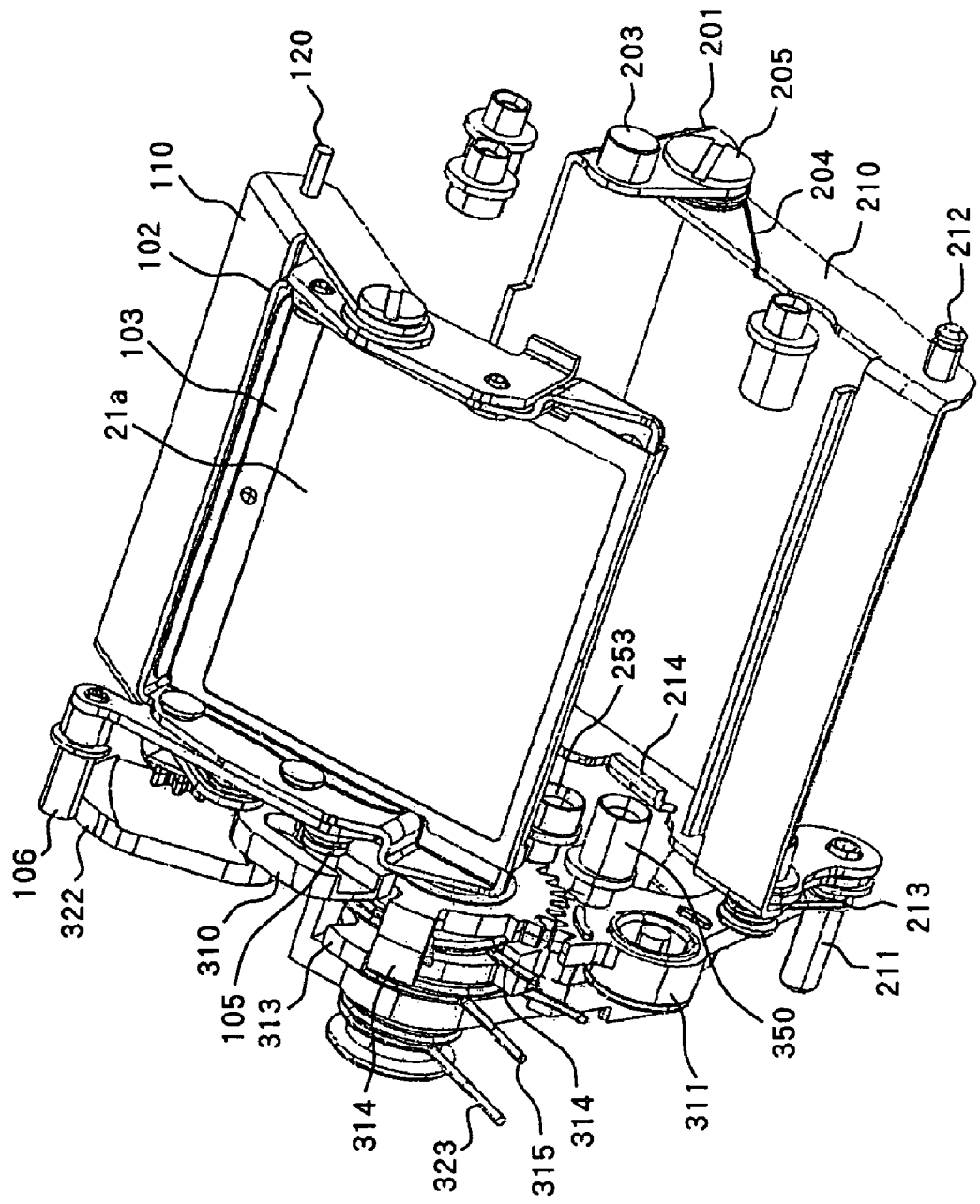
FIGS. 12 to 15 are perspective views of the mirror mechanism in the middle of switching between the EVF mode and the image-taking mode.

Here, in FIG. 12, when the half-mirror-unit driving cam 322 gives a rotational force to the half-mirror holding plate 102, the angle formed between the half-mirror holding plate 102 and the half-mirror holder lever 110 changes. Since the rotation speed of the half-mirror holding plate 102 becomes larger than that of the half-mirror holder lever 110, the drive trajectory of the half mirror unit 21 in the EVF mode is different from that in the OVF mode.

Figure 13:
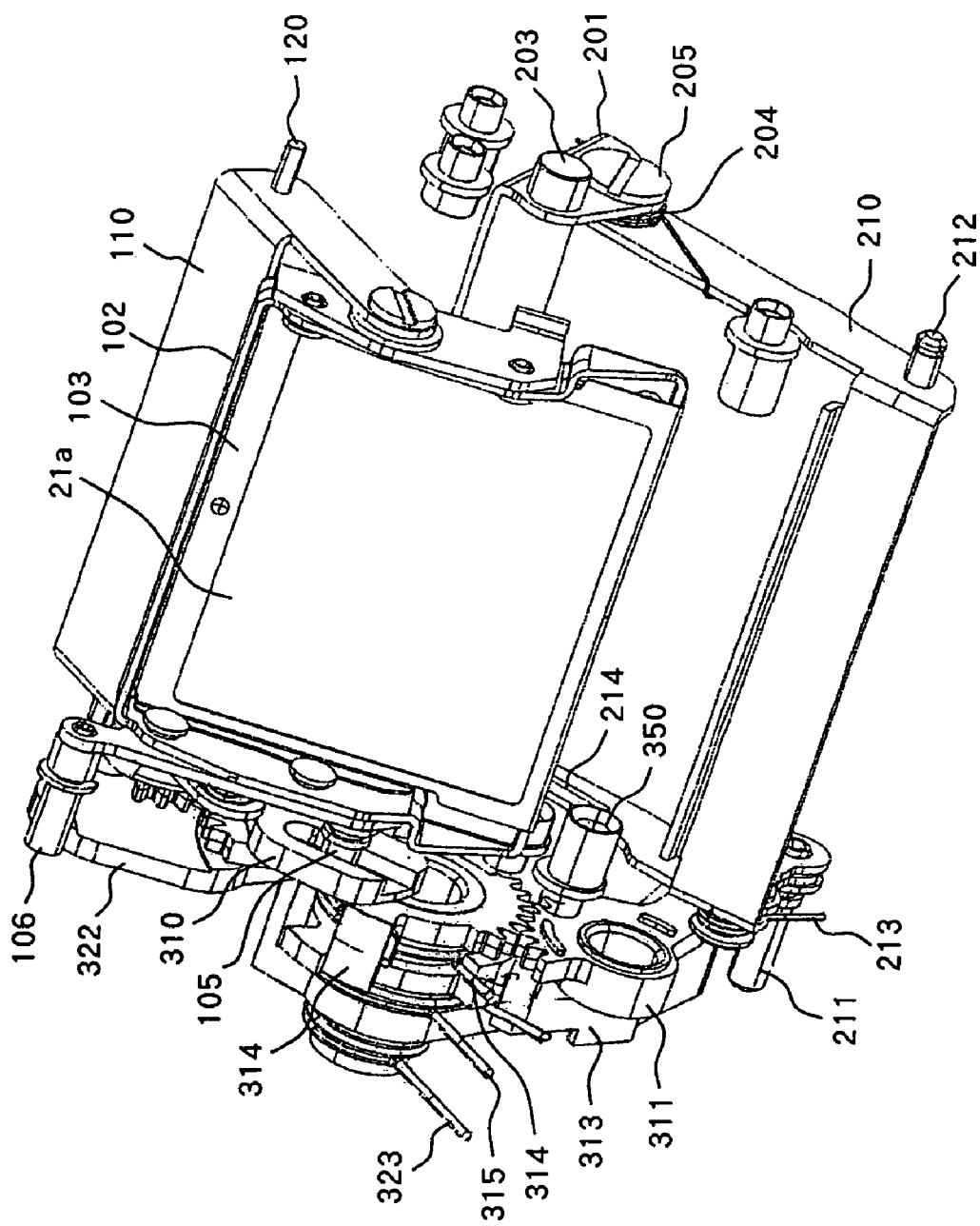
Figure 14:
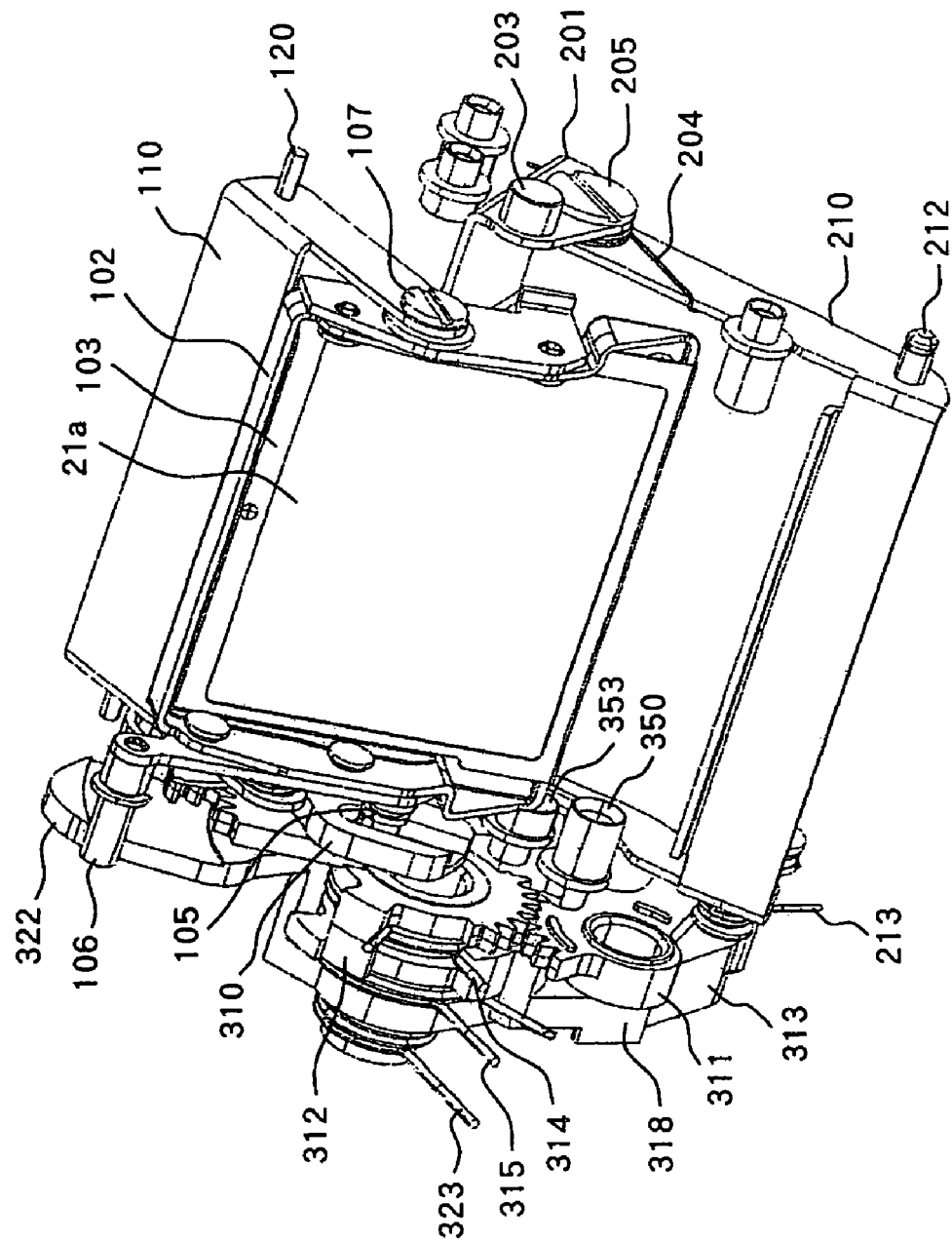

When the drive further progresses, the mirror driving mechanism changes as shown FIGS. 13, 14 and 15. In FIG. 13, the half-mirror camshaft 106 is driven along the half-mirror-unit driving cam 322 in the half mirror unit 21. Therefore, the moving trajectory of the mirror tip of the half mirror unit 21 is closer to the half-mirror hinge shaft 120 than that in the OVF mode, which was described using FIGS. 9 to 11.

Accordingly, the half mirror unit 21 passes on a side closer to the half-mirror hinge shaft 120 than the half-mirror positioning member 350. Thereby, the half mirror unit 21 is driven without contacting the half-mirror positioning member 350.

When the mirror driving mechanism has been driven to the object observation state shown in FIG. 16 from the states shown in FIGS. 14 and 15 sequentially, the mirror driving lever 313 has been driven by an amount larger than the operation amount for driving the half mirror unit 21. In this state, a rotational force generated in the mirror driving gear 312 by the charge of the absorbing spring 314 is transmitted to the half mirror unit 21.

The half mirror unit 21 is positioned so that its position can be adjusted by the half-mirror positioning member 351 and the half-mirror-lever positioning member 352, which are fixed to the mirror box 20.

Moreover, the absorbing spring 314 has absorbed the over charged amount of the mirror driving lever 313, and presses the half mirror unit 21 to the half-mirror positioning member 351 and the half-mirror-lever positioning member 352 to fix it. The half-mirror camshaft 106 is away from the half-mirror-unit driving cam 322 for preventing a change of the position and angle of the half mirror unit 21 in the EVF mode.

The sub mirror unit 23 is retreated outside the image-taking optical path by the operation of the sub-mirror driving shaft 211 that the external driving force is input with the mirror driving lever 313.

Furthermore, the shutter lever 320 is driven to charge the shutter unit, not shown in the figure, and then the shutter lever 320 is released. Thereby, it is possible to take an image formed on the image-pickup device 31 and display it on the display device 32.

The switching operation from the object observation state to the image-taking state in the EVF mode is performed in reverse order from the above-described operation in FIGS. 11 to 16.

First, the shutter unit, which is opened for taking images in the object observation state shown in FIG. 16, is charged. Then, the shutter driving lever 320 is released as the shutter is held in the charged state. After that, the mirror-up operation is started.

In the mirror-up operation, when the driving force that has been added to the input portion 316 of the mirror driving lever 313 is eliminated, the mirror driving lever 313 is driven by the biasing force of the mirror driving spring 315. Thereby, the drive of the half mirror unit 21 and the sub mirror unit 23 is started.

In this state, since the shutter driving lever 320 is released, the half mirror unit 21 is driven as the half-mirror camshaft 106 contacts the half-mirror-unit driving cam 322. Therefore, the half mirror unit 21 is driven without contacting the half-mirror positioning member 350. In actual operation, the mirror driving mechanism becomes the image-taking state shown in FIG. 11 by the series of operation shown in FIGS. 15 to 12.

The mirror driving mechanism operates from the image-taking state to the object observation state shown in FIGS. 6 and 16 by driving only the mirror driving lever 313 of the mirror driving lever 313 and the shutter driving lever 320.

The mirror driving lever 313 is configured so as to operate in conjunction with the drive of the shutter driving lever 320 via the shutter-driving-lever interlocking portion 318. However, since the shutter driving lever 320 is not configured so as to operate in conjunction with the drive of the mirror driving lever 313, the shutter driving lever 320 is driven freely in the object observation state of the EVF mode. Therefore, by repeating the charge operation of the shutter unit by the shutter driving lever 320 and the exposure operation, it is possible to take images in the object observation state without driving the mirror driving mechanism.

In the above description, each operation of the mirror driving mechanism was explained with reference to FIGS. 9 to 16. In addition to this, the operation of the camera system is as follows.

Image-taking Operation from the OVF Mode

When an image-taking start signal is input to the camera system while observing an object in the OVF mode, the mirror driving mechanism is driven from the object observation state to the image-taking state, as described in FIGS. 9 to 11. The exposure operation is performed in the image-taking state, and then the mirror driving mechanism is driven from the image-taking state to the object observation state in which the object image can be confirmed through the optical viewfinder 40, as described in FIGS. 9 to 11. Thus, a series of image-taking operation is performed.

Image-taking Operation from the EVF Mode

When the image-taking start signal is input to the camera system while observing an object in the EVF mode, the mirror driving mechanism is driven from the object observation state to the image-taking state, as described in FIGS. 11 to 16. The exposure operation is performed in the image-taking state, and then the mirror driving mechanism is driven from the image-taking state to the object observation state in which the object image can be confirmed through the display device 32, as described in FIGS. 11 to 16. Thus, a series of image-taking operation is performed.

Switching Operation from the OVF Mode to the EVF Mode

To switch from the OVF mode to the EVF mode, first, the mirror driving mechanism is driven from the object observation state in the OVF mode to the image-taking state, as described in FIGS. 9 to 11. After that, the mirror driving mechanism is driven from the image-taking state to the object observation state in the EVF mode, as described in FIGS. 11 to 16. Thereby, the camera system is set to the EVF mode, and it becomes possible to confirm an object image through the display device 32.

Switching Operation from the EVF mode to the OVF Mode

To switch from the EVF mode to the OVF mode, first, the mirror driving mechanism is driven from the object observation state in the EVF mode to the image-taking state, as described in FIGS. 11 to 16. After that, the mirror driving mechanism is driven from the image-taking state to the object observation state in the OVF mode, as described in FIGS. 9 to 11. Thereby, the camera system is set to the OVF mode, and it becomes possible to confirm an object image through the optical viewfinder 40.

The description was given of the camera system in which the lens apparatus is detachably mounted on the camera body in the above embodiment, however the present invention can be applied to optical apparatuses such as an image-taking apparatus having a fixed lens.

Further, the description was given of the mirror operation between three states, which are the object observation state in the OVF mode, the object observation state in the EVF mode and the image-taking state, in the above embodiment, however the present invention is not limited thereto.

As described above, according to the above-mentioned embodiment, since a positioning member for positioning the sub mirror unit 23 in the object observation state in the OVF mode and a positioning member for positioning the half mirror unit 21 in the object observation state in the EVF mode are different from each other, it is possible to achieve the reduction of the adjustment time and the increase of the adjustment accuracy of the optical path dividing system in each mode.

In addition, since the positioning members are provided in the vicinity of the mirror driving lever, deformation of the optical path dividing system is prevented, thereby making it possible to increase the stability of the optical path dividing system.

This application claims foreign priority benefits based on Japanese Patent Application No. 2004-191318, filed on Jun. 29, 2004, which is hereby incorporated by reference herein in its entirety as if fully set forth herein.

What is claimed is:

1. An optical apparatus comprising:
   a viewfinder optical system;
   a focus detection device;
   a first mirror movable between a first position where the first mirror leads an incident light flux to the viewfinder optical system and a second position where the first mirror leads the incident light flux to the focus detection device;
   a second mirror movable between a third position where the second mirror leads an incident light flux to the focus detection device and a fourth position where the light flux is not led to the second mirror;
   a first positioning member, which positions the first mirror at the second position; and
   a second positioning member, which positions the second mirror at the third position,
   wherein the second positioning member is a member independent of the first positioning member.

2. The optical apparatus according to claim 1, further comprising:
   a first driving member, which drives the first mirror;
   a third positioning member, which contacts the first driving member to position the first mirror at the second position;
   a second driving member, which drives the second mirror; and
   a fourth positioning member, which contacts the second driving member to position the second mirror at the third position.

3. The optical apparatus according to claim 1, wherein a first distance between an image-taking optical axis and the first positioning member is different from a second distance between the image-taking optical axis and the second positioning member.

4. The optical apparatus according to claim 3, wherein the first distance is shorter than the second distance.

5. The optical apparatus according to claim 1, wherein the first positioning member is a first eccentric pin, and the second positioning member is a second eccentric pin,
wherein the positions of the first and second mirrors are adjusted by rotating the first and second eccentric pins, respectively.

6. The optical apparatus according to claim 1, wherein the first mirror is a half mirror, and the second mirror leads the light flux transmitted through the first mirror to the focus detection device.

7. The optical apparatus according to claim 2 further comprising:
a mirror driver, which drives the first and second driving members,
wherein the third and fourth positioning members are provided on a side closer to the mirror driver.

* * * * *